US 8,443,454 B2

(12) United States Patent
Lim et al.

(10) Patent No.: US 8,443,454 B2
(45) Date of Patent: May 14, 2013

(54) METHOD AND APPARATUS FOR PREVENTING ILLEGAL REUSE OF DIGITAL RIGHT MANAGEMENT CONTENT IN PORTABLE TERMINAL

(75) Inventors: Woo-Gyu Lim, Seoul (KR); Chang-Gie Lee, Yongin-si (KR); Young-Hoon Min, Suwon-si (KR); Jae-Min Jung, Seoul (KR); Seok-Kyu Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 626 days.

(21) Appl. No.: 12/140,620

(22) Filed: Jun. 17, 2008

(65) Prior Publication Data

US 2008/0313745 A1    Dec. 18, 2008

(30) Foreign Application Priority Data

Jun. 18, 2007    (KR) .................. 10-2007-0059355

(51) Int. Cl.
*H04L 29/06*    (2006.01)

(52) U.S. Cl.
USPC ........................................... 726/28

(58) Field of Classification Search ........................ None
See application file for complete search history.

(56) References Cited

U.S. PATENT DOCUMENTS

| | | | |
|---|---|---|---|
| 2005/0267845 A1* | 12/2005 | Oh et al. ..................... | 705/51 |
| 2005/0267846 A1* | 12/2005 | Sato et al. .................. | 705/59 |
| 2006/0021056 A1 | 1/2006 | Koppen | |

* cited by examiner

*Primary Examiner* — Hadi Armouche
*Assistant Examiner* — Simon Kanaan
(74) *Attorney, Agent, or Firm* — The Farrell Law Firm, P.C.

(57) ABSTRACT

A method and apparatus for preventing illegal reuse of Digital Right Management (DRM) content in a portable terminal is provided. The method includes performing user authentication when there is an attempt to restore a Right Object (RO) backup file, and identifying information on the RO backup file to be pre-restored in a terminal, and determining if the RO backup file can be restored according to the identified information.

13 Claims, 4 Drawing Sheets

US 8,443,454 B2

METHOD AND APPARATUS FOR PREVENTING ILLEGAL REUSE OF DIGITAL RIGHT MANAGEMENT CONTENT IN PORTABLE TERMINAL

PRIORITY

This application claims priority under 35 U.S.C. §119(a) to Korean patent application filed in the Korean Intellectual Property Office on Jun. 18, 2007 and assigned Serial No. 2007-59355, the contents of which are incorporated herein by reference.

BACKGROUND OF THE INVENTION

1. Field of the Invention

The present invention relates generally to a method and apparatus for preventing illegal reuse of Digital Right Management (DRM) content in a portable terminal, and more particularly to a method and apparatus for preventing illegal reuse of DRM content by using information on a Right Object (RO) file indicating a right to use the DRM content.

2. Description of the Related Art

Recently, the prolific advancement in electrical and electronics industries has spawned the development of various digital technologies. As a result, DRM is being widely used. The DRM is a technique for preventing illegal copying of digital content in order to secure right and interest of a digital content provider and for collectively supporting accounting, distribution and management in the use of the digital content.

According to the DRM, the use of specific DRM content is permitted only in devices for which a right to use the DRM content has been attained. Since the DRM content is composed of an encoded content file and an RO file having a key capable of decoding the encoded content file, the content cannot be used in the device if RO cannot be properly obtained.

In addition, users frequently replace their portable terminals. To cope with this trend, a technique is provided in which DRM content used in an old portable terminal can also be used in a new portable terminal. For example, referring to FIG. 1, a user of specific content 150 through a terminal-A 100, changes his or her portable phone to a terminal-B 120. In this case, an RO for the specific content 150 stored in the terminal-A 100 is backed up (step 110), restored in terminal-B 102 (step 130) and is then subject to a user authentication process (step 132). Accordingly, the specific content 150 can be used in terminal-B 102. When terminal-A 100 backs up the RO, an RO backup file is created in terminal-A 100, and the RO is deleted. The RO backup file may be stored in another terminal or be moved to a computer by using an external memory card.

In the aforementioned method, DRM content is reused in such as manner that an RO of DRM content is backed up and then restored in another terminal. With this method, the DRM content can be used only according to whether user authentication is successful. Therefore, when duration of use or the number of times of use the DRM content recorded in the RO are exhausted by the user, and thereafter if the backup file is restored and the user authentication process is performed, then the user authentication is successful and thus the DRM content can be reused. That is, when a conventional DRM backup and restoration technique is used, the user can use the DRM content without limitation, which results in a problem that right and interest of a DRM content provider cannot be protected.

SUMMARY OF THE INVENTION

An aspect of the present invention is to address at least the above-mentioned problems and/or disadvantages and to provide at least the advantages described below. Accordingly, an aspect of the present invention is to provide a method and apparatus for preventing illegal reuse of DRM content in a portable terminal.

Another aspect of the present invention is to provide a method and apparatus for preventing illegal reuse of DRM content by using information on an RO file in a portable terminal.

According to the present invention, a method of preventing illegal reuse of DRM content in a portable terminal includes performing user authentication when there is an attempt to restore an RO backup file, and identifying information on the RO backup file to be pre-restored in a terminal, and determining if the RO backup file can be restored according to the identified information.

According to another aspect of the present invention, an apparatus for preventing illegal reuse of DRM content in a portable terminal includes a user authentication unit for performing user authentication when there is an attempt to restore an RO backup file, and a controller for identifying information on the RO backup file to be pre-restored in a terminal, and determining if the RO backup file can be restored according to the identified information.

BRIEF DESCRIPTION OF THE DRAWINGS

The above and other aspects, features and advantages of preferred embodiments of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail for the sake of clarity and conciseness.

Hereinafter, a method and apparatus for preventing illegal reuse of DRM content by using information on an RO file that indicates a right to use the DRM content in a portable terminal will be described.

Figure 1:
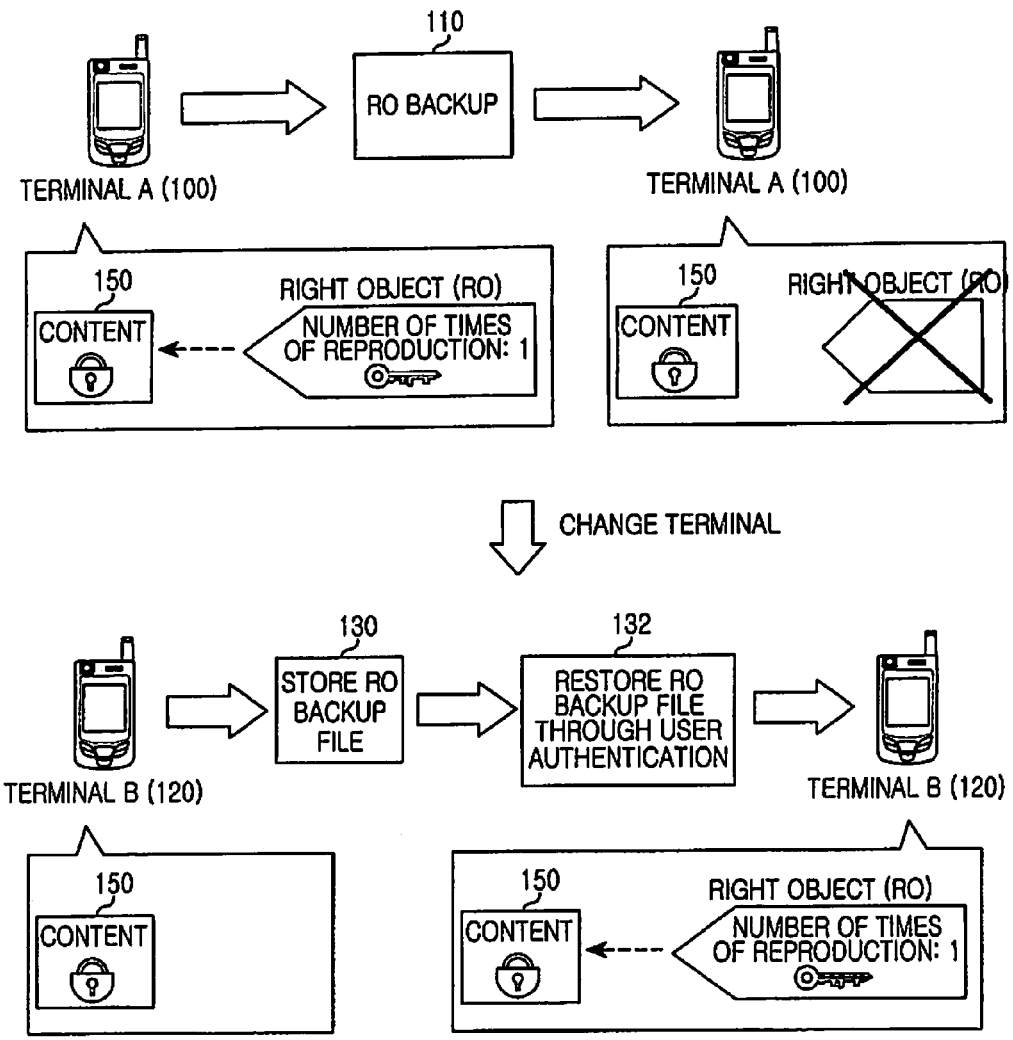
FIG. 1 illustrates a conventional process of backing up and restoring DRM content in a portable terminal.
Figure 2:
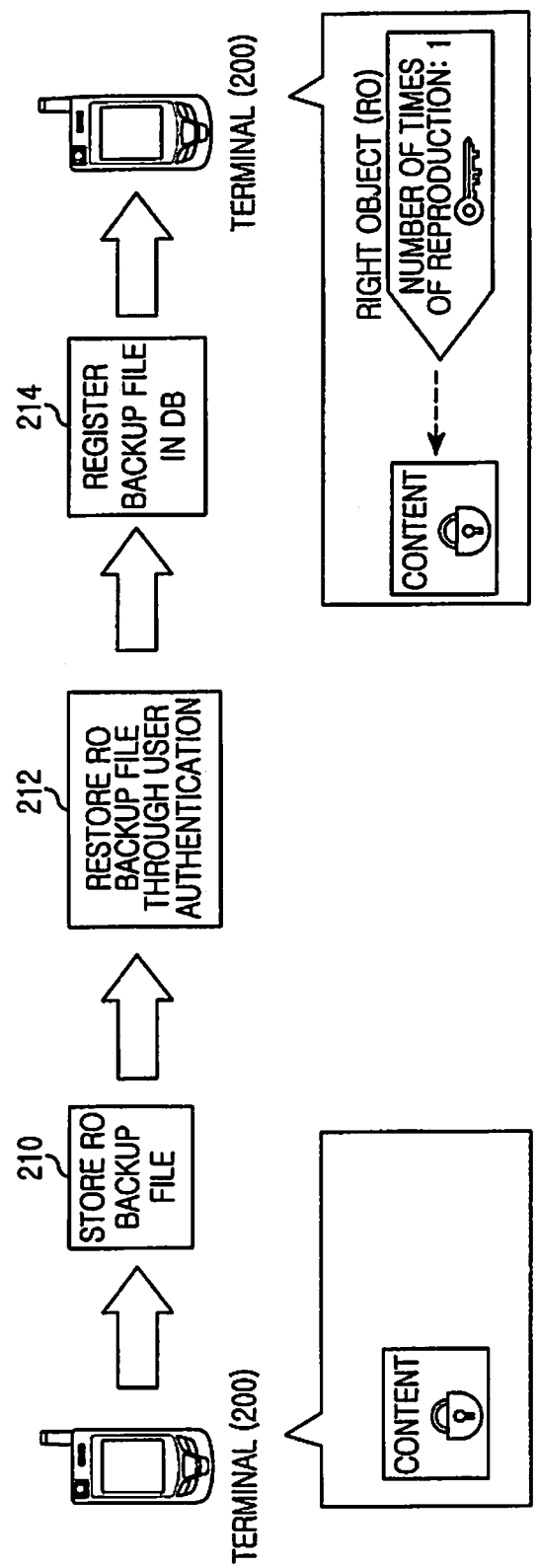
FIG. 2 illustrates a process of restoring DRM content in a portable terminal according to the present invention.

FIG. 2 illustrates a process of restoring DRM content in a portable terminal according to the present invention.

Referring to FIG. 2, when a user stores an RO backup file for specific content in step 210, a terminal 200 performs a user authentication process and thus restores the RO backup file in step 212. The user authentication process may be performed by using user information recorded in a Subscriber Identification Module (SIM) card or a network connection.

When the user authentication process is successful, the terminal 200 registers information on the RO backup file in a DataBase (DB) in step 214. Examples of the information include a name of a backup file, a Content IDentification (CID) that indicates content recorded in the backup file and the number of ROs recorded in the backup file. Thereafter, the terminal 200 allows the user to use the specific content. When the RO backup file is pre-registered in the DB, the terminal 200 may enable or disable the use of the DRM content according to whether pre-registered information is the same as information on the RO backup file to be registered.

Figure 3:
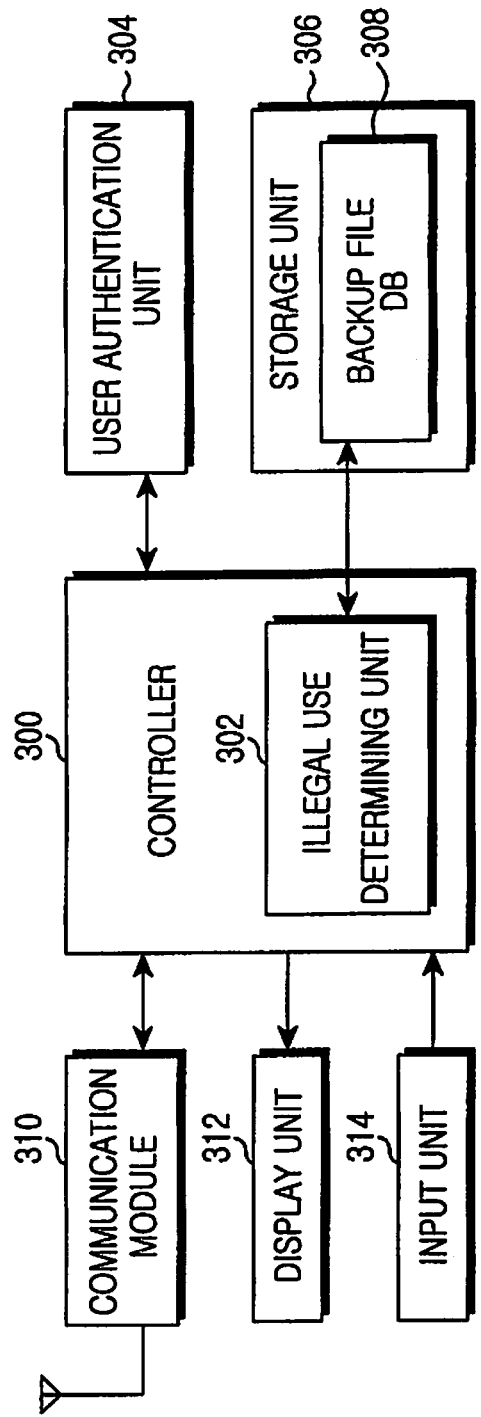
FIG. 3 is a block diagram of a portable terminal according to the present invention.

FIG. 3 is a block diagram of a portable terminal according to the present invention. The portable terminal includes a controller 300, an illegal use determining unit 302, a user authentication unit 304, a storage unit 306, a backup file DB 308, a communication module 310, a display unit 312 and an input unit 314.

Referring to FIG. 3, the controller 300 controls voice calls and data communications. According to the present invention, when a user attempts to restore an RO backup file for specific DRM content, the controller 300 performs a user authentication process and then determines whether information on the RO backup file is pre-registered in a DB so as to enable or disable the use of the DRM content. That is, when the user attempts to restore the RO backup file, the controller 300 requests the user authentication unit 304 to perform the user authentication process. In response thereto, the determination result on whether the user authentication process is successful is provided to the controller 300. The controller 300 includes the illegal use determining unit 302, and thus, when the user authentication process is successful, the backup file DB 308 is searched to determine whether information on the RO backup file is pre-registered therein. According to this determination, the controller 300 determines whether to enable or disable the use of the DRM content.

The illegal use determining unit 302 checks whether information (e.g., a name of a backup file name, a CID indicating content recorded in the backup file, or the number of ROs recorded in the backup file) is pre-registered in the backup file DB 308. If the information on the RO backup file is not pre-registered, the illegal use determining unit 302 registers the information in the backup file DB 308. If the information on the RO backup file is pre-registered, the illegal use determining unit 302 checks whether the pre-registered information is the same as the information on the RO backup file. If the two pieces of information are not the same, the illegal use determining unit 302 registers the information on the RO backup file in the backup file DB 308 and thus updates the pre-registered information, thereby allowing the use of the DRM content. If the two pieces of information are the same, the illegal use determining unit 302 performs a function for prohibiting the use of the DRM content.

When the controller 300 requests the user authentication unit 304 to perform the user authentication process, the user authentication unit 304 determines whether a current user of a terminal is the same as a user who has a right to use the DRM content, and then provides the determination result to the controller 300. The user authentication unit 304 may perform the user authentication process by using user information recorded in a SIM card or by using a network connection.

The storage unit 306 stores a microcode of a program for controlling the controller 300 as well as various reference data. In particular, the storage unit 306 stores DRM content (e.g., music and moving pictures). Since the backup file DB 308 is provided according to the present invention, the storage unit 306 stores the information on the RO backup file that indicates the right to use the DRM content. That is, the backup file DB 308 stores such information as a name of the backup file, a CID indicating content recorded in the backup file and the number of ROs stored in the backup file.

The communication module 310 transmits and receives a wireless signal of data that is input/output through an antenna. The display unit 312 displays, for example, state information generated during the portable terminal's operation, numbers and characters, and large volumes of moving and still pictures. In particular, whether the use of DRM content is enabled or disabled may be displayed. The input unit 314 includes a plurality of function keys so that data corresponding to a key pressed by the user is delivered to the controller 300.

Figure 4:
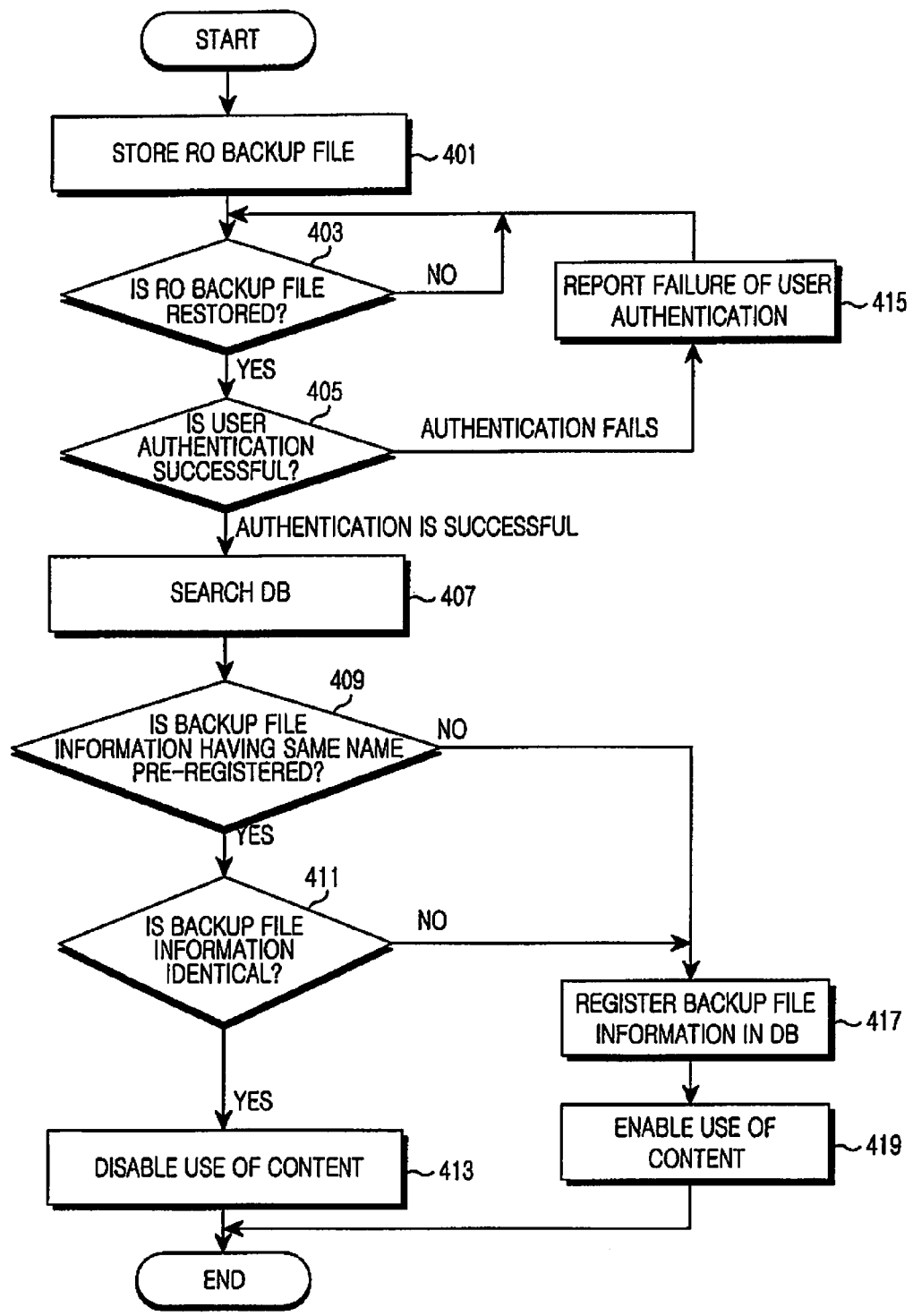
FIG. 4 illustrates a method of preventing illegal use of DRM content in a portable terminal according to the present invention.

FIG. 4 illustrates a method of preventing illegal use of DRM content in a portable terminal according to the present invention.

Referring to FIG. 4, a user stores an RO backup file for specific content in step 401. Then, it is determined whether there is an attempt to restore the stored RO backup file in step 403.

When the restoration is attempted, in step 405, a user authentication process is performed to determine whether the user of the terminal has a right to use the specific content. The user authentication process may be performed by using a network connection or user information recorded in a SIM card.

If the user who has the right to use the specific content is different from the user of the terminal, and thus the user authentication fails, then failure of the user authentication is reported in step 415. Thereafter, the process returns to step 403, and the subsequent steps are repeated.

However, if the user who has the right to use the specific content is the same as the user of the terminal, and thus the user authentication is successful, the backup file DB 308 is searched in step 407. Thereafter, in step 409, it is determined whether information on a backup file having the same name as that of a pre-registered RO backup file exists in the backup file DB 308. For example, if the name of the RO backup file stored in the terminal is "20070310.rel", it is determined whether information on an RO backup file having this name exists in the backup file DB 308.

If there is no such information on the backup file having the same name as that of the pre-registered RO backup file, in step 417, information on the RO backup file is registered in the backup file DB 308. For example, if the RO backup file has a name "20070310.rel" and includes three ROs respectively having CIDs "ABC1111", "ABC1112", and "ABC1113", then the name, the CIDs and the number of ROs are registered in the backup file DB 308 as the information on the RO backup file. Thereafter, in step 419, the use of the DRM content is enabled according to duration of use or the number of use times indicated in the RO backup file, and then the procedure of FIG. 4 is ended.

If there is information on the backup file having the same name as that of the pre-registered RO backup file, it is determined whether the information on the backup file existing in the backup file DB 308 is identical to information on the pre-registered RO backup file in step 411.

If the two pieces of information are not the same, in step 417, the information on the RO backup file is registered in the backup file DB 308. Thereafter, in step 419, the use of the DRM content is enabled according to duration of use or the number of use times indicated in the RO backup file, and then the procedure of FIG. 4 is ended. For example, assume that information existing in the backup file DB 308 shows "name: 20070310.rel, CID: ABC1111, ABC1112, ABC1113, and number of ROs: 3", while information on the RO backup file stored by the user shows "name: 20070310.rel, CID:

ABC1111, ABC1112, and number of ROs: 2". In this case, since the two pieces of information are different, the information on the pre-registered RO backup file is registered in the backup file DB 308. Thereafter, the backup file DB 308 is updated, and then the use of the content is enabled.

However, if the two pieces of information are the same, in step 413, it is determined that the user has attempted to reuse the DRM content without authorization, and the use of the DRM content is disabled. Then, the procedure of FIG. 4 is ended.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

According to the present invention, when a user intends to backup DRM content used in a specific portable terminal so that the DRM content can be used in another portable terminal, information on an RO backup file indicating a right to use the DRM content is registered in a DB, and the use of the DRM content is enabled or disabled by using the information. Since the DRM content, for which duration of use or the number of use times is limited, can be prevented from unrestricted use, there is an advantage in that right and interest of a DRM content provider can be protected.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of preventing illegal reuse of Digital Right Management (DRM) content in a portable terminal, the method comprising:
    performing user authentication when there is an attempt to restore a Right Object (RO) backup file;
    determining whether information on the RO backup file is pre-registered in the terminal;
    registering the information on the RO backup file in the terminal, when the information on the RO backup file is not pre-registered in the terminal;
    determining whether the pre-registered information is identical to the information on the RO backup file, when the information on the RO backup file is pre-registered in the terminal; and
    determining whether the RO backup file can be restored according to whether the pre-registered information is identical to the information on the RO backup file,
    wherein determining if the RO backup file can be restored comprises:
        disabling a restore of the RO backup file, when the pre-registered information is identical to the information on the RO backup file, and
        enabling a restore of the RO backup file in the terminal, when the pre-registered information is not identical to the information on the RO backup file.

2. The method of claim 1, wherein determining whether the information on the RO backup file is pre-registered in the terminal further comprises determining whether the information on the backup file having the same name as that of the RO backup file exists in the terminal.

3. The method of claim 2, wherein determining if the RO backup file can be restored according to whether the pre-registered information is identical to the information on the RO backup file further comprises disabling the use of the content when the pre-registered information is identical to the information on the RO backup file.

4. The method of claim 2, wherein determining if the RO backup file can be restored according to whether the pre-registered information is identical to the information on the RO backup file further comprises enabling the use of the content.

5. The method of claim 2, wherein enabling the restore of the RO backup file in the terminal further comprises:
    registering the information on the RO backup file in the terminal; and
    enabling the use of the content.

6. The method of claim 1, wherein the information on the RO backup file comprises at least one selected from a group consisting of a name of the backup file, a unique identification code of content recorded in the backup file, and the number of ROs recorded in the backup file.

7. The method of claim 1, wherein the user authentication is performed by using a network connection or user information recorded in a Subscriber Identification Module (SIM) card.

8. An apparatus for preventing unauthorized reuse of Digital Right Management (DRM) content in a portable terminal, the apparatus comprising:
    a user authentication unit for performing user authentication when there is an attempt to restore a Right Object (RO) backup file; and
    a controller for determining whether information on the RO backup file is pre-registered in the terminal, if the information on the RO backup file is not pre-registered in the terminal, registering the information on the RO backup file in the terminal, and if the information on the RO backup file is pre-registered in the terminal, determining whether the pre-registered information is identical to the information on the RO backup file, and determining if the RO backup file can be restored according to whether the pre-registered information is identical to the information on the RO backup file,
    wherein the controller disables a restore of the RO backup file when the pre-registered information is identical to the information on the RO backup file, and enables a restore of the RO backup file in the terminal when the pre-registered information is not identical to the information on the RO backup file.

9. The apparatus of claim 8, wherein the information on the RO backup file comprises at least one selected from a group consisting of a name of the backup file, a unique identification code of content recorded in the backup file, and the number of ROs recorded in the backup file.

10. The apparatus of claim 8, further comprising a Data-Base (DB) for storing the information on the RO backup file, wherein the controller determines whether the information on the backup file having the same name as that of the RO backup file exists in the DB.

11. The apparatus of claim 10, wherein the controller disables the use of the content when the pre-registered information is identical to the information on the RO backup file, and enables the use of the content when the pre-registered information is not identical to the information on the RO backup file, and enables the use of the content when the information on the RO backup file is not pre-registered in the terminal.

12. The apparatus of claim 8, wherein the user authentication is performed by using user a network connection or information recorded in a Subscriber Identification Module (SIM) card.

13. A non-transitory computer-readable recording medium having recorded hereon a program for preventing illegal reuse of Digital Right Management (DRM) content in a portable terminal, comprising:
- a first code segment, for performing user authentication when there is an attempt to restore a Right Object (RO) backup file; and
- a second code segment, for determining whether information on the RO backup file is pre-registered in the terminal; and
- a third code segment, for registering the information on the RO backup file in the terminal, when the information on the RO backup file is not pre-registered in the terminal and determining whether the pre-registered information is identical to the information on the RO backup file when the information on the RO backup file is pre-registered;
- a fourth code segment, for disabling a restore of the RO backup file when the pre-registered information is identical to the information on the RO backup file; and
- a fifth code segment, for enabling a restore of the RO backup file in the terminal when the pre-registered information is not identical to the information on the RO backup file.

* * * * *